United States Patent [19]

Sugiyama

[11] Patent Number: 5,588,074
[45] Date of Patent: Dec. 24, 1996

[54] DATA RECOGNITION EQUIPMENT AND METHOD USING PARTIAL PATTERN RECOGNITION

[75] Inventor: Mitsumasa Sugiyama, Yokohama, Japan

[73] Assignee: Canon Kabushiki Kaisha, Tokyo, Japan

[21] Appl. No.: 131,913

[22] Filed: Oct. 4, 1993

Related U.S. Application Data

[63] Continuation of Ser. No. 504,625, Apr. 4, 1990, abandoned.

[30] Foreign Application Priority Data

Apr. 6, 1989 [JP] Japan .................................. 1-085655

[51] Int. Cl.$^6$ .............................. G06K 9/62; G06K 9/46
[52] U.S. Cl. ............................ 382/209; 382/190
[58] Field of Search ................................ 382/13, 9, 30, 382/23, 21, 39, 31, 38, 33, 24, 37, 190, 177, 209, 229, 218, 200, 217

[56] References Cited

U.S. PATENT DOCUMENTS

| | | | |
|---|---|---|---|
| 4,027,284 | 5/1977 | Hoshino et al. | 382/38 |
| 4,561,105 | 12/1985 | Crane et al. | 302/13 |
| 4,607,386 | 8/1986 | Morita e al. | 382/23 |
| 4,653,107 | 3/1987 | Shojima et al. | 382/13 |
| 4,654,873 | 3/1987 | Fujisawa et al. | 382/38 |
| 4,672,677 | 6/1987 | Yamakawa | 382/13 |
| 4,680,804 | 7/1987 | Kuzunuki et al. | 382/13 |
| 4,685,142 | 8/1987 | Ooi et al. | 382/24 |
| 4,703,511 | 10/1987 | Conoval | 382/13 |
| 4,718,103 | 1/1988 | Shosing et al. | 382/13 |
| 4,827,330 | 5/1989 | Yamaguchi et al. | 382/13 |
| 4,878,249 | 10/1989 | Mifune et al. | 382/13 |
| 4,953,225 | 8/1990 | Togawa et al. | 382/13 |

*Primary Examiner*—Jose L. Couso
*Assistant Examiner*—Matthew C. Bella
*Attorney, Agent, or Firm*—Fitzpatrick, Cella, Harper & Scinto

[57] ABSTRACT

A data recognition equipment includes an input device for inputting pattern data, and a selection device which recognizes a partial pattern data in the input pattern data and selects a candidate pattern for pattern recognition of the input pattern data. The equipment also includes two comparing devices. The first one compares the selected candidate with the input pattern data at a part other than the partial pattern data. The second one compares the selected candidate and the input pattern data at a part of the partial pattern based on the results of the comparison made by the first comparing device. The equipment also includes a determining device which determines the results of recognition among the selected candidates based on the results of the comparisons by the first and second comparing devices.

11 Claims, 7 Drawing Sheets

FIG. 3

| PARTIAL PATTERN CODE | NO. OF STROKES | POSITION CODE |
|---|---|---|
| 1 | 2 | 1 |
| ⋮ | ⋮ | ⋮ |
| 7 | 6 | 1 |
| ⋮ | ⋮ | ⋮ |
| 15 | 4 | 2 |

FIG. 4

| PARTIAL PATTERN CODE | 1 |
|---|---|
| COORDINATES OF 1ST STROKE | (30, 92), (5, 46) |
| COORDINATES OF 2ND STROKE | (21, 63), (22, 3) |
| THRESHOLD | 56 |

DATA RECOGNITION EQUIPMENT AND METHOD USING PARTIAL PATTERN RECOGNITION

This application is a continuation, of application Ser. No. 07/504,625, filed Apr. 4, 1990, now abandoned.

BACKGROUND OF THE INVENTION

1. Field of the Invention

The present invention is generally related to data recognition equipment and to a data recognition method, and particularly to equipment and a method for recognizing written data such as hand-written characters, symbols, drawings, etc.

2. Related Background Art

Conventionally this sort of equipment employs such method as the input of coordinates using a pen and up–down data of pen movement on a data tablet, etc., and uses those data to identify or recognize characters written on the data tablet. For on-line character recognition, in order to cope with the increase of processing involved in the recognition of Chinese characters, proposals have been made on methods such as the following: a partial pattern is first recognized, at the side or in the main body of the Chinese character, prior to the comparison of the features of input data with the character data of a dictionary, character data to be compared are selected and the input data are compared with a smaller number of candidate characters, thus saving the time required for recognition.

However, in the case of the above conventional systems, comparison is made of the entire character, and therefore the time involved in recognition has remained high. To be concrete, even when it is found that a given character is impossible to recognize, processing proceeds until the comparison of the entire character is over, and therefore time is wasted.

SUMMARY OF THE INVENTION

The present invention has been made in the light of such conventional case as above, and its objective is to offer a data recognition equipment and method which shortens the time required for recognition by executing recognition at a higher efficiency.

In order to solve the above problems and achieve the object of the invention, the data recognition equipment of the present invention is characterized by an input means to input pattern data, a selection means to recognize a partial pattern data among the input pattern data and select a candidate used for recognition of the input pattern data, a first comparing means to compare the selected candidate with the input pattern data at a part other than the partial pattern data, a second comparing means to obtain an indication of a degree of difference with a reference (e.g., a distance), and a third comparing means to compare the candidate which was selected based on the results of comparison made by the first comparing means with the input pattern data at a part of the partial pattern.

In the light of the aforesaid, the object of the present invention is achieved by providing a data processing equipment and method wherein the input means inputs the pattern data, the selection means recognizes a part of the partial pattern data among the input pattern data and selects a candidate for recognition of the input pattern data, the first comparing means compares the selected candidate with the input pattern data at the part other than the partial pattern data, and the second comparing means compares the selected candidate with the input pattern data at another part of the partial pattern based on the results of comparison made by the first comparing means.

In the light of the above, the object of the present invention is also achieved by providing a data recognition equipment and method in which a dictionary means stores pattern data, a partial pattern dictionary means stores partial pattern data and a restricting means restricts the pattern data to be compared with the input pattern and stored data in the dictionary means based on the input pattern data and the partial pattern data stored in the partial pattern dictionary means.

BRIEF DESCRIPTION OF THE DRAWINGS

FIG. 1 shows a block diagram to explain the composition of the data recognition equipment of a first embodiment of the present invention;

FIGS. 2 to 4 show the contents of the partial pattern dictionary of the present embodiment;

DESCRIPTION OF THE PREFERRED EMBODIMENTS

In reference to the attached drawings, the preferred embodiments of the present invention are explained hereunder in detail. In regard to the data recognition equipment and method of the present embodiment, the case of recognition of Kanji, or Chinese characters as the written data is explained.

Figures 1, 2:
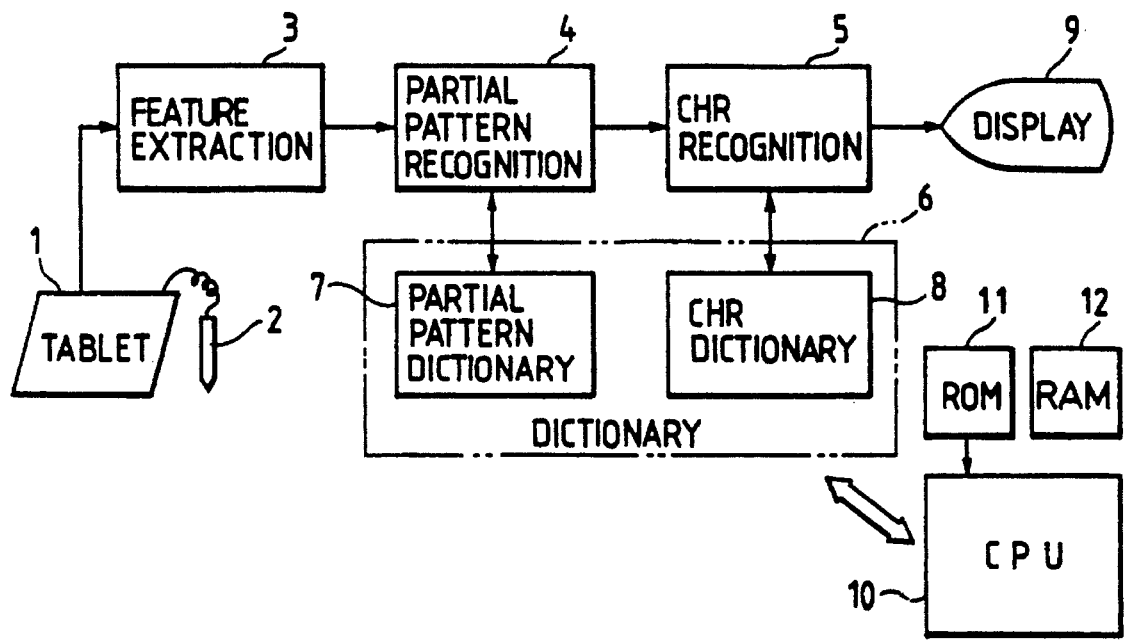

FIG. 1 is a block diagram to explain the composition of the data recognition equipment of the present embodiment and FIGS. 2 to 4 are drawings to explain the contents of the partial pattern dictionary 7 of the present embodiment. In FIG. 1 represents the tablet to detect the coordinates position and input written data, the tablet 1 using pressure sensitive electroconductive rubber (or supersonic digitizer). 2 represents the input pen to indicate the position coordinates of the pen 2 on tablet 1, 3 represents the feature extractor, which normalizes the position and size of the written data (input pattern) of one character and extracts features such as number of strokes, coordinates of the end points of each stroke, shape characteristics of each stroke, etc. 4 represents the partial pattern recognizer which recognizes the written data of one Chinese character input by the tablet 1, that is, the shape of the partial pattern according to the side or body of a Chinese character in reference to the input pattern. 7 represents the partial pattern dictionary 7, which registers the partial pattern for recognizing the shape of the partial pattern shown in FIG. 2 in the partial pattern recognizer 4, the partial pattern corresponding with the partial pattern code. In the partial pattern dictionary 7 are registered the stroke number and position code of a given partial pattern corresponding to the partial pattern code (FIG. 3). As for this position code, "1" indicates the partial pattern at the start of writing of the character and "2" indicates the partial pattern at the end of writing of the character. For example, when a partial pattern has the side portion "亻", the partial pattern code is "1" (FIG. 2) and the stroke number is "2" and the position code is "1". With the partial pattern dictionary 7, when the side portion is "亻", the starting point coordinates (30, 92) and end point coordinates (5, 46) of the first stroke and the starting point coordinates (21, 63) and end point coordinates (22, 3) of the second stroke are registered as the position coordinates of "亻", in correspondence with the partial pattern code "1", as shown in FIG. 4, and further the difference threshold "56" is registered for recognition of the input pattern as the partial pattern of "亻" registered in the partial pattern dictionary 7. This threshold is the value which is compared with the sum of the distances between strokes of the input pattern and the partial pattern of side "亻" registered in the partial pattern dictionary 7.

Figure 5:
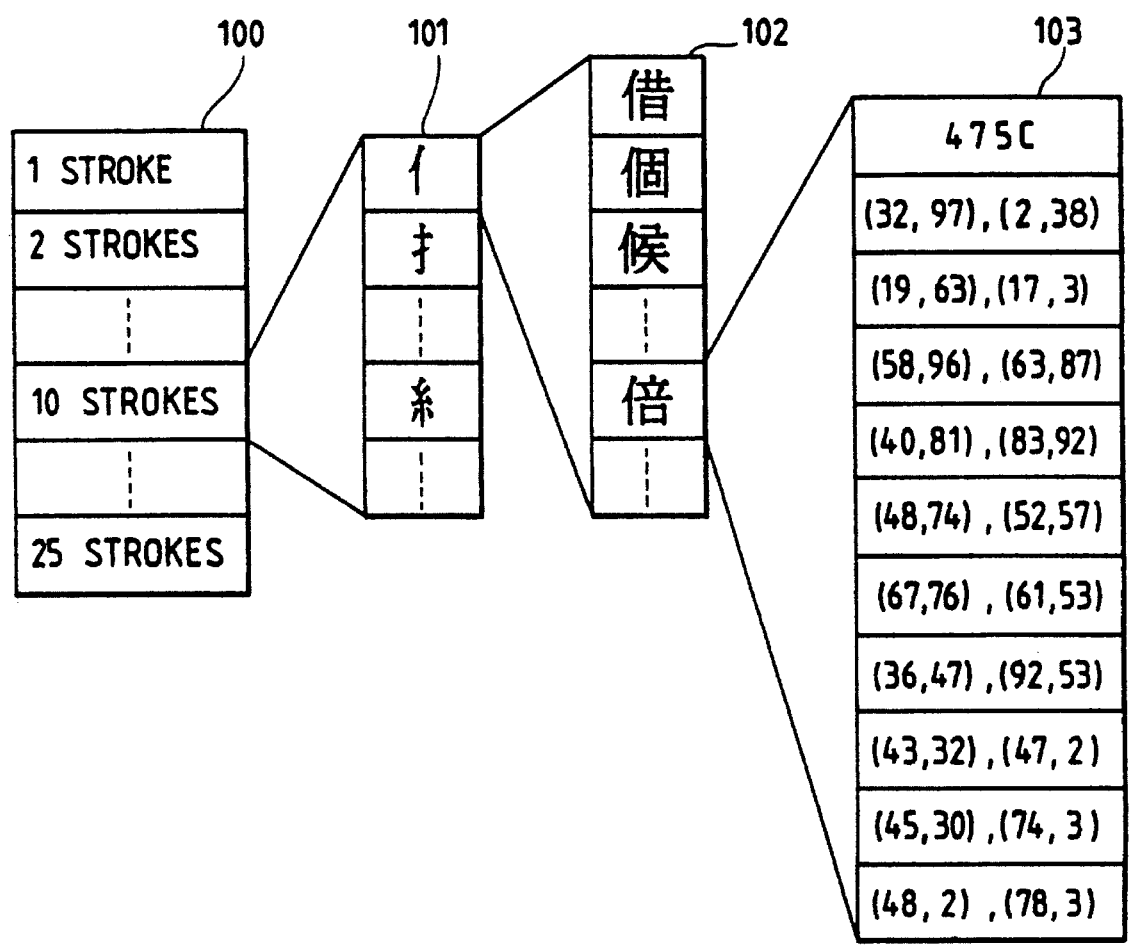
FIG. 5 shows the contents of the character dictionary 8.

5 represents the character recognizer which recognizes the character at the part other than the partial pattern recognized by the partial pattern recognizer and based on the results of such recognition, the shape of input pattern is recognized as a character. 8 represents the character dictionary in which the character data used for character recognition by character recognizer 5 are registered as shown in FIG. 5.

FIG. 5 is the drawing to explain the contents of character dictionary 8. In FIG. 5, 100 represents the table of stroke number of partial pattern, 101 is the partial pattern table in which the partial pattern of 10 strokes is registered for an example, 102 represents the Chinese character table in which the Chinese character having partial pattern "亻" is registered, 103 represents the stroke data table in which the character code of Chinese character "倍" (read "bai" and meaning "double") and the position of coordinates (x, y) of the starting point and end point of each stroke composing the Chinese character "倍" are registered. In this stroke data table 103, positions of coordinates are registered by the order of stroke. Here the partial pattern dictionary 7 and character dictionary 8 are together termed dictionary 6.

Next the character recognition process of this embodiment is explained.

Figure 6:
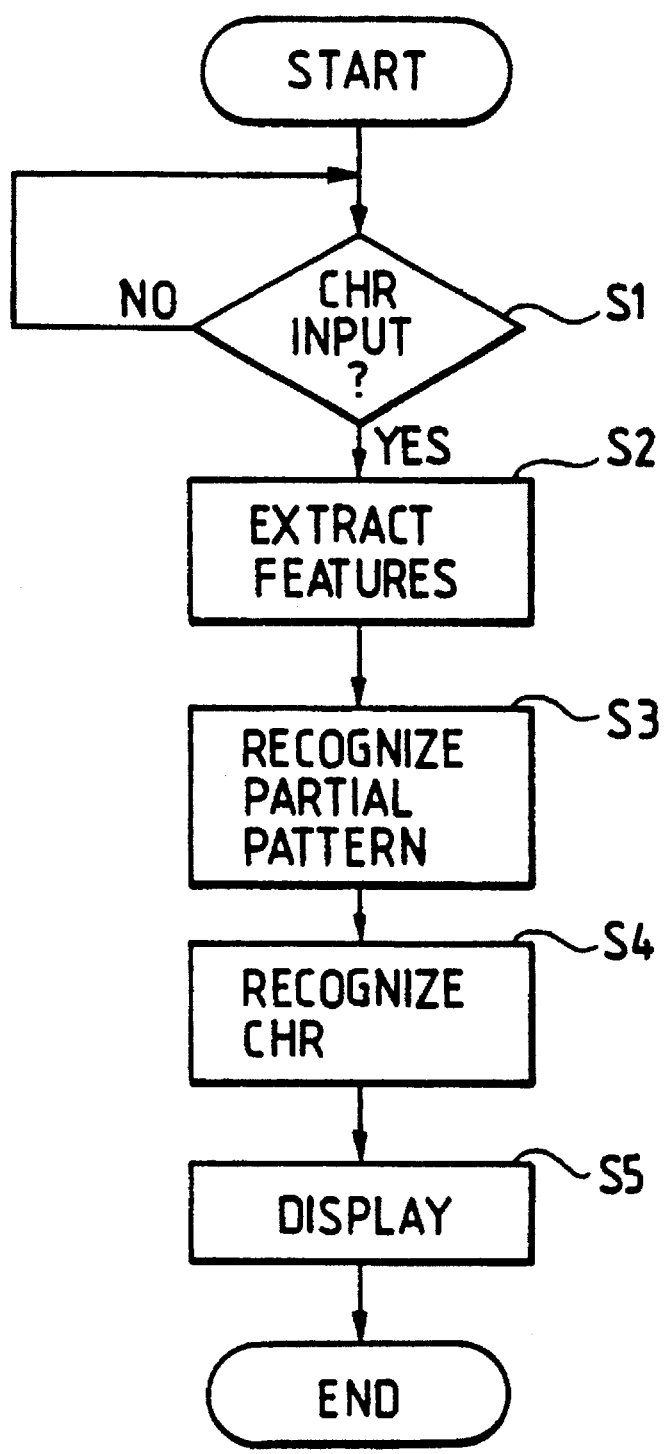
FIG. 6 is a flow chart to explain the actions of the overall character recognition process of the device and method of the present invention.

FIG. 6 is the flow chart to explain the actions of the overall character recognition process of the present embodiment.

When a character pattern is input at tablet 1, the feature of input pattern is extracted by feature extractor 3 (step S1, step S2). From extracted features, the partial pattern of the input pattern is recognized by partial pattern recognizer 4 (step S3). Then at the character recognizer 5, the character with smaller difference is recognized based on the recognized partial pattern (step S4) and the results of such recognition are displayed at the display 9 (step S5).

Next the recognition process of partial pattern of step S3 and character recognition process of step S4 as aforesaid are explained in detail.

First the partial pattern recognition process is explained.

Figure 7:
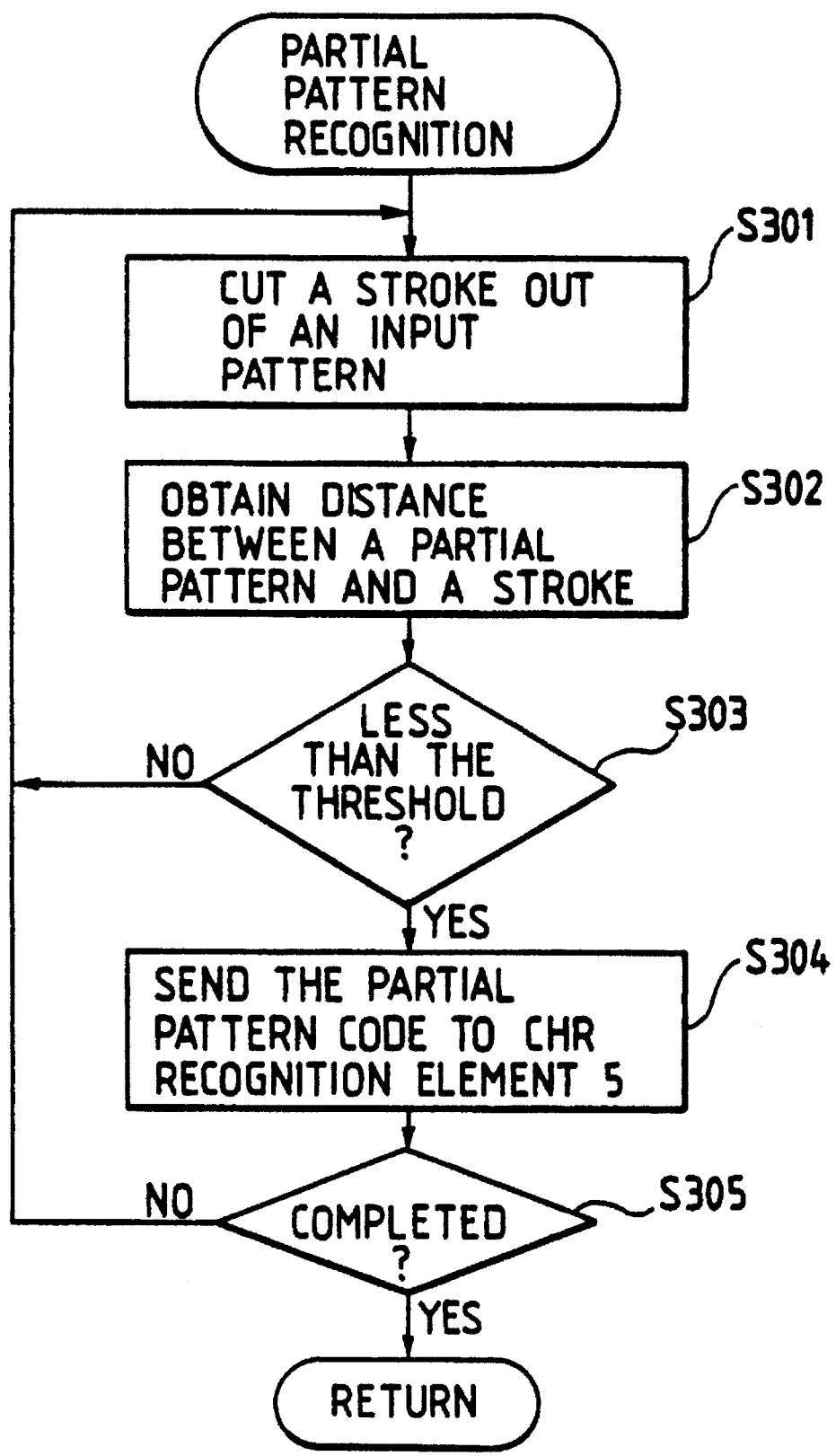
FIG. 7 is a flow chart to explain the actions of partial pattern recognition process of the device and method of the present invention.

FIG. 7 is the flow chart to explain the actions of partial pattern recognition process of the present embodiment.

In this step, the stroke corresponding to the partial pattern is cut out of the input stroke extracted by feature extractor 3 in reference to the stroke number and position code registered in partial pattern dictionary 7 (step S301) and the sum of the distance between starting points and the distance between end points of the cut stroke and partial pattern is obtained (step S302). The thus obtained distance between the partial pattern and the stroke corresponding to such partial pattern is compared with the threshold registered for such partial pattern (step S303) and if such distance is smaller than the threshold, the partial pattern code of the partial pattern having been compared with the input stroke at such time point is delivered to the character recognizer 5 in step S304. Until the comparisons with all partial patterns with which comparison should be made are completed, the above processing steps starting with step S301 are repeated (step S305). If, at step S303, the distance between the partial pattern and the stroke corresponding to such partial pattern is judged to be larger than the threshold, the processing returns to step S301 and similar processing is repeated.

In the above partial pattern recognition process, it may be so arranged, though not mentioned hereinabove, that when recognition of a partial pattern is impossible with a given input pattern, processing may be terminated judging the input as an error input.

Next the character recognition process is explained.

Figure 8:
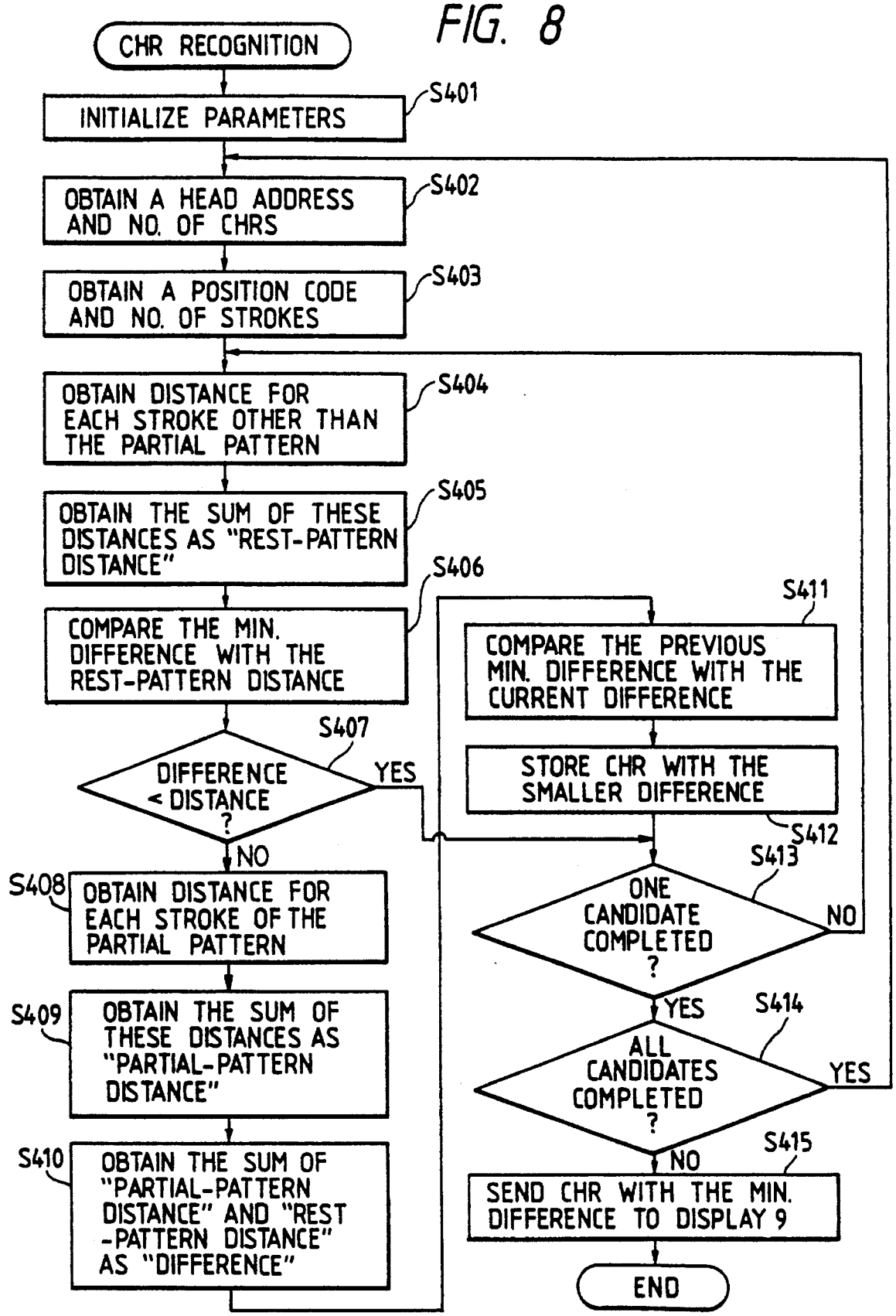
FIG. 8 is a flow chart to explain the action of character recognition process of the device and method of the present invention.

FIG. 8 is the flow chart to explain the actions of character recognition process of the present embodiment.

First the initialization is conducted which sets the parameters indicating the minimum difference at the maximum level that can be set (step S401). Then regarding the first candidate partial pattern sent from the partial pattern recognizer 4, the head address and character number of the corresponding character in the table 102 of character dictionary 8 are obtained (step S402). Further, the position code and stroke number of the candidate partial pattern are stored (step S403).

Then the stroke part other than the partial pattern of the input stroke is compared with the first character in the table 102 and the distance between the starting points and end points of such stroke and those of the first character are obtained (step S404), and the total sum of thus obtained distances is set as the "rest-pattern distance" (step S405). Then the minimum difference (parameter) obtained before and the size of the rest-pattern distance obtained in step S405 are compared (step S406). Up to this step, the minimum difference is set at a large level as the comparison is the first round comparison and therefore the rest-pattern distance is judged to be smaller (step S407). Therefore the processing proceeds to step S408 and the distance between the character and the part of the partial pattern being compared is obtained, stroke by stroke, based on the position code and the stroke number of the partial pattern of the candidate stored in step S403. Then the total sum of the stroke-to-stroke distances is obtained and such sum is deemed the partial pattern distance (step S409).

Then the rest-pattern distance and the partial pattern distance obtained respectively in step S405 and step S409 are summed and such sum is deemed the difference from the character being compared (step S410). Then the previous minimum difference and the difference obtained in step S410 are compared (step S411) and as the result, the character with the smaller difference from the shape of input stroke is stored as the character having the minimum difference (step S412). Here, the character having been used in the current comparison is stored as the character having minimum difference. As above, when comparison of one character data is completed, the steps from step S404 are repeated until comparisons with all the characters in the same candidate partial pattern are completed (step S413). In the comparison of second time and on of the input pattern and the character in the dictionary, the previous minimum difference is compared with the rest-pattern distance being processed in step S407 and the difference of the character having the previous minimum difference is compared with the difference of the character being processed in step S412.

As above, when comparison of one candidate partial pattern is over (step S413) and if a following candidate pattern exists (step S414), the mode returns to step S402 and the above processing steps are repeated. When comparison is over for all candidate partial patterns (step S414), the character having the minimum difference is decided to be the results of recognition and it is output at display 9 (step S415).

As above, according to the present embodiment, it is possible to shorten the recognition time by efficiently executing the recognition process.

In the above embodiment, when the rest-pattern distance of the character compared with the input pattern is larger than the previous minimum difference, the comparison of the features of input pattern with the character in the dictionary being compared is discontinued, but the present invention is not limited to this arrangement and the comparison may be discontinued in such way as follows.

Figure 9:
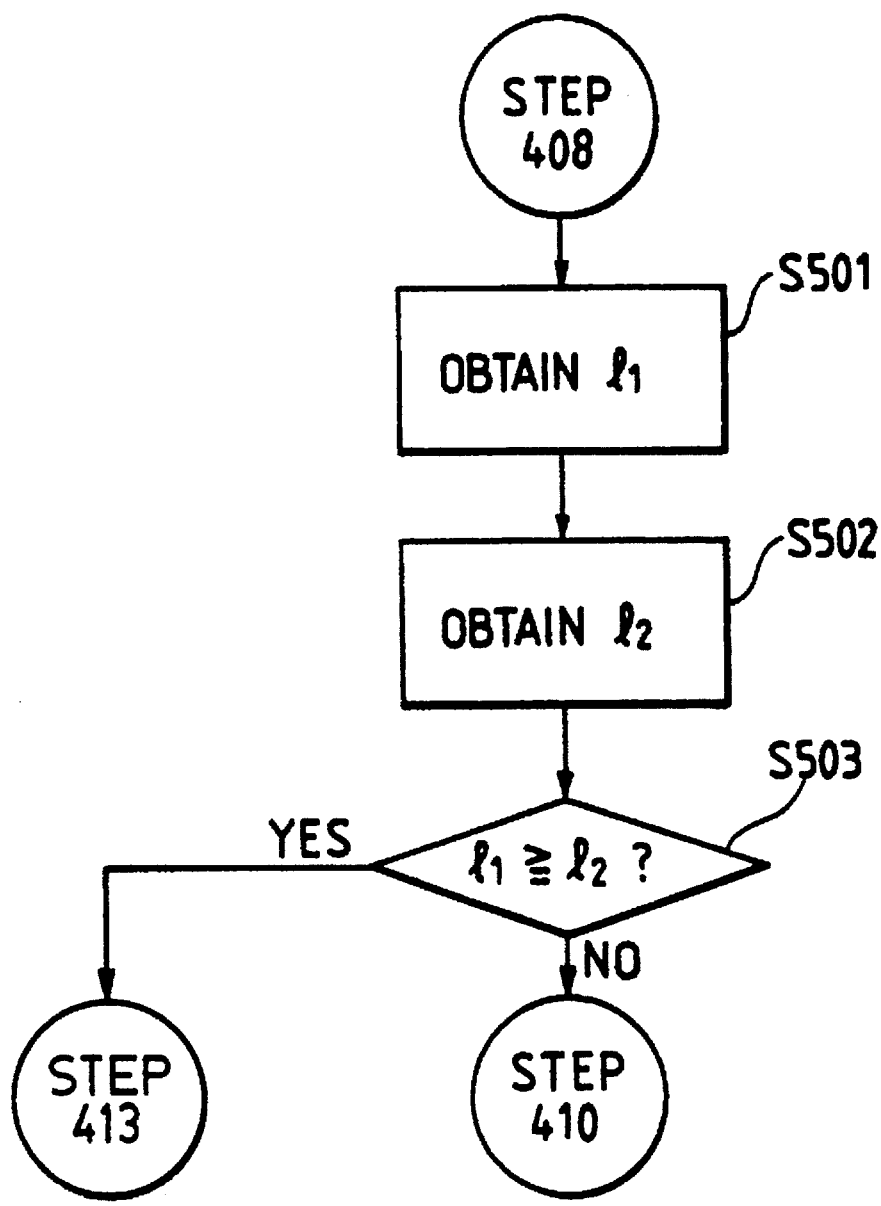
FIG. 9 is a flow chart to explain an example of a modification of the comparison process.

FIG. 9 is the flow chart to explain the example of modification of the comparison process.

In this case, the average position data of the stroke of the partial pattern of each group of partial pattern is registered at the head of each partial pattern of table 101 of character dictionary 8. First in the partial pattern recognition process, for the comparison of input pattern and the partial pattern in the dictionary (step S302 of FIG. 7), the distance between each stroke of the input pattern and the average position data of each stroke of partial pattern is obtained and the sum of such distances is used as the difference in average position data. As the method of character recognition, it uses the modification of step S409 of the flow chart of FIG. 8 explained in the above examplary embodiment. When processing proceeds in this way up to step S408, the sum of the distances between each stroke of partial pattern and each stroke of the character registered in the dictionary is obtained as shown in FIG. 9 and such sum is named the partial pattern distance $l_1$ (step S501). Then the difference of average position data is subtracted from the current minimum difference. The result of such subtraction is named $l_2$ (step S502). Only when the partial pattern distance $l_1$ is larger than the value $l_2$ obtained by subtracting the difference of average position data from the current minimum difference, does the processing proceed to step S413 shown in FIG. 8 and the comparison with the character currently being compared is discontinued, whereas if the partial pattern distance $l_1$ is smaller than the value $l_2$ obtained by subtracting the distance of average position data from the current minimum difference, processing is continued beyond the step S410 shown in FIG. 8 (step S503).

By such method, also, a similar function and effect as those obtained in the above example of embodiment are obtained.

Alternatively, the system may be so arranged that in the comparison of input pattern and character data in character dictionary 8, when the rest-pattern distance is larger than a certain value determined by the strokes of input pattern or strokes of character data, the later comparison of the features of input pattern and the character data is discontinued.

Further, in the above examplary embodiment, the stroke in the character dictionary 8 having the minimum stroke-to-stroke distance vis-a-vis each stroke other than the partial pattern of the input pattern is deemed the corresponding stroke, but it may be so modified that utilizing the stroke number and position code of the partial pattern as the input pattern, the input stroke of the input pattern other than the partial pattern, having the minimum stroke to stroke distance may be deemed the corresponding stroke. For example, in the comparison of "倍" (read "bai" and meaning "double") with the features of input data, for each stroke of the part other than the partial pattern of "倍", the stroke other than the first two strokes of the input data and the stroke to stroke distance are obtained and the input stroke having the minimum stroke-to-stroke distance is deemed the corresponding stroke.

In the above examplary of embodiment, the result of character recognition is output at the display 9 but it goes without saying that such output may be made at apparatus such as a printer.

As explained in the above, according to the present invention, the recognition time may be shortened by efficiently executing the recognition process.

I claim:

1. Data recognition equipment comprising:

dictionary means for storing partial pattern data and pattern data;

inputting means for inputting segmented pattern data;

recognition means for recognizing partial pattern data among input pattern data from said inputting means by comparison with the partial pattern data stored in said dictionary means;

selection means for selecting a candidate pattern having the recognized partial pattern from said dictionary means;

first comparing means for comparing the selected candidate pattern with the input pattern data for each part other than the recognized partial pattern data and for outputting a distance obtained from the comparison in correspondence to the selected candidate pattern;

second comparing means for comparing the output distance from said first comparing means with a reference value; and third comparing means for comparing the selected candidate pattern with the input pattern data at a part of the recognized partial pattern if it is determined that the distance is smaller than the reference value by said second comparing means; and output means for outputting character information representing the candidate pattern compared with the input pattern data by said third comparing means.

2. Data recognition equipment according to claim 1, wherein, when it is determined that the distance is smaller than the reference value, the distance is used as a new reference value in a succeeding comparison by said second comparing means.

3. Data recognition equipment according to claim 1, wherein, when it is determined that the distance is larger than the reference value, a new candidate is selected.

4. Data recognition equipment according to claim 1, wherein said selection means recognizes a partial pattern data on the basis of position data and the number of strokes.

5. Data recognition equipment according to claim 1, wherein said inputting means comprises a tablet.

6. Data recognition equipment according to claim 1, wherein said output means comprises a display device.

7. A data recognition method comprising the steps of:

storing partial pattern data and pattern data;

inputting segmented pattern data;

recognizing a partial pattern data among the input pattern data by comparison with the partial pattern data stored in a dictionary;

selecting a candidate pattern having the recognized partial pattern from said dictionary;

a first comparing step for comparing the selected candidate pattern with the input pattern data at each part other than the recognized partial pattern data and outputting a distance obtained from the comparison in correspondence to the selected candidate pattern;

a second comparing step for comparing the output distance with a reference value; and a third comparing step for comparing the selected pattern with the input pattern data at a part of the recognized partial pattern if it is determined that the degree of difference is smaller than the reference value in said second comparing step; and outputting character information representing the candidate pattern compared with the input pattern data by said third comparing step.

8. A data recognition method according to claim 7, wherein, when it is determined that the distance is smaller than the reference value, the distance is used as a new reference value in a succeeding performance of said second comparing step.

9. A data recognition method according to claim 7, wherein, when it is determined that the distance is larger than the reference value, a new candidate is selected.

10. A data recognition method according to claim 7, wherein, in said selecting step, the partial pattern data is recognized on the basis of position data and the number of strokes.

11. A storage medium for storing a program executed in a data recognition apparatus, the program comprising the steps of:

storing partial pattern data and pattern data;

inputting segmented pattern data;

recognizing partial pattern data among the input pattern data by comparison with the partial pattern data stored in a dictionary;

selecting a candidate pattern having the recognized partial pattern from the dictionary;

a first comparing step of comparing the selected candidate pattern with the input pattern data at each part other than the recognized partial pattern data and outputting a distance obtained from the comparison in correspondence to the selected candidate pattern;

a second comparing step of comparing the output distance with a reference value;

a third comparing step of comparing the selected candidate pattern with the input pattern data at a part of the recognized partial pattern if it is determined that the distance is smaller than the reference value in said second comparing step; and outputting character information representing the candidate pattern compared with the input pattern data in said third comparing step.

* * * * *

UNITED STATES PATENT AND TRADEMARK OFFICE
CERTIFICATE OF CORRECTION

PATENT NO. : 5,588,074

DATED : December 24, 1996

INVENTOR : Mitsumasa Sugiyama

It is certified that error appears in the above-identified patent and that said Letters Patent is hereby corrected as shown below:

COVER SHEET

Under [56] References Cited, U.S. Patent Documents, "Shosing et al." should read --Shojima et al.--.

COLUMN 2

Line 50, "FIG. 1 represents" should read --FIG. 1, represents--; and
Line 59, "recognizer" should read --recognizer,--.

Signed and Sealed this

Thirteenth Day of May, 1997

*Attest:*

BRUCE LEHMAN

*Attesting Officer*     Commissioner of Patents and Trademarks